(12) United States Patent
Morris, II et al.

(10) Patent No.: US 12,210,993 B2
(45) Date of Patent: *Jan. 28, 2025

(54) PREDICTIVE ANALYTICS SYSTEMS AND METHODS

(71) Applicant: RTX Corporation, Arlington, VA (US)

(72) Inventors: Robert Glenn Morris, II, Fernandino Beach, FL (US); Mario Montag, Atlanta, GA (US); Phillippe Thys, Antwerp (BE)

(73) Assignee: RTX CORPORATION, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/222,534

(22) Filed: Jul. 17, 2023

(65) Prior Publication Data

US 2024/0046182 A1 Feb. 8, 2024

Related U.S. Application Data

(63) Continuation of application No. 15/910,719, filed on Mar. 2, 2018, now Pat. No. 11,748,684, which is a
(Continued)

(51) Int. Cl.
| | |
|---|---|
| *G06Q 10/0635* | (2023.01) |
| *G06N 5/02* | (2023.01) |
| *G06N 5/04* | (2023.01) |
| *G06N 7/01* | (2023.01) |
| *H04W 4/38* | (2018.01) |

(52) U.S. Cl.
CPC ........... *G06Q 10/0635* (2013.01); *G06N 5/04* (2013.01); *G06N 5/02* (2013.01); *G06N 7/01* (2023.01); *H04W 4/38* (2018.02)

(58) Field of Classification Search
None
See application file for complete search history.

(56) References Cited

U.S. PATENT DOCUMENTS

| | | |
|---|---|---|
| 2005/0060213 A1 | 3/2005 | Lavu et al. |
| 2011/0106510 A1 | 5/2011 | Poon |
| | (Continued) | |

OTHER PUBLICATIONS

Salfner, F., et al.: "A survey of online failure prediction methods", ACM Computing Surveys, vol. 42, No. 3, article 10, 2010, 42 pages (Year: 2010).

*Primary Examiner* — Vincent Gonzales
(74) *Attorney, Agent, or Firm* — CANTOR COLBURN LLP

(57) ABSTRACT

Various examples of methods and systems are provided for improved predictive analytics. In one example, a method of managing operation of an asset or group of assets of interest includes comparing a generated prediction with one or more prediction range associated with a risk profile assigned to an operational outcome of interest, presenting a notification to an operator in response to the comparison, and incorporating operator-generated input as updated source data for the generation of subsequent predictions. The operator-generated input can comprise an operator-defined selection such as, e.g., acceptance of the notification, or rejection of the notification. The operator-generated input can provide real time or near real time information based upon context-specific knowledge that the operator holds that is substantially independent of historical source data.

20 Claims, 4 Drawing Sheets

Related U.S. Application Data continuation of application No. 15/475,754, filed on Mar. 31, 2017, now abandoned.

(56) References Cited

U.S. PATENT DOCUMENTS

| | | |
|---|---|---|
| 2015/0323422 A1 | 11/2015 | Sarda et al. |
| 2016/0231871 A1 | 8/2016 | Davis |
| 2016/0343093 A1 | 11/2016 | Riland et al. |
| 2016/0350671 A1 | 12/2016 | Morris, II et al. |
| 2017/0011312 A1 | 1/2017 | Subramanian et al. |
| 2017/0064412 A1 | 3/2017 | Taxier |
| 2017/0098376 A1 | 4/2017 | Wang |
| 2018/0109955 A1 | 4/2018 | Nixon et al. |
| 2018/0136288 A1 | 5/2018 | Wolfe et al. |

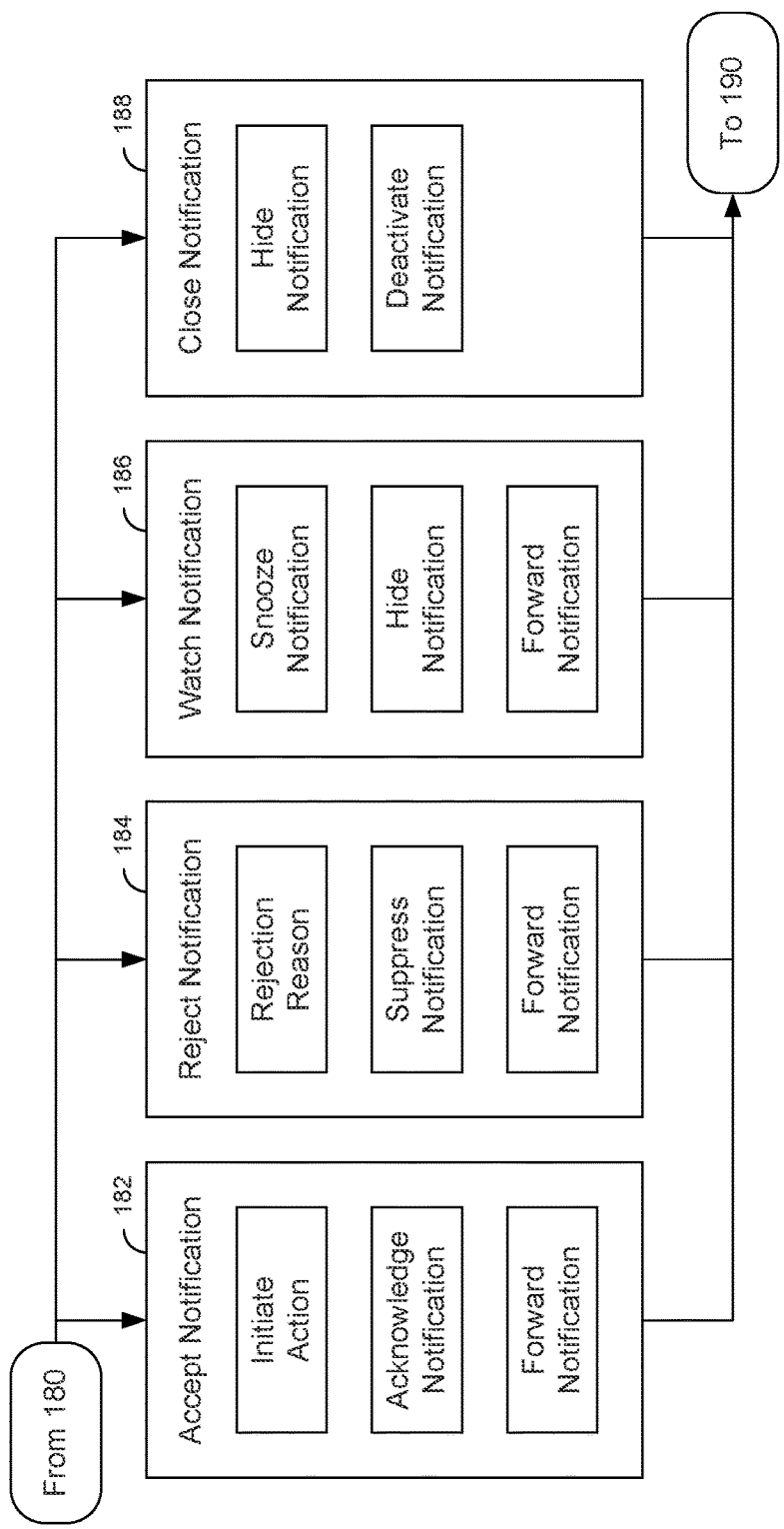

PREDICTIVE ANALYTICS SYSTEMS AND METHODS

CROSS REFERENCE TO RELATED APPLICATIONS

This application is a Continuation of U.S. patent application Ser. No. 15/910,719 filed Mar. 2, 2018, which is a Continuation of U.S. patent application Ser. No. 15/475,754 filed Mar. 31, 2017, which are incorporated herein by reference in its entirety.

BACKGROUND

In recent years, the amount of information available from monitoring operation of asset-intensive environments has been greatly magnified by the amount of data available from sensors and machines. Such collected asset data has been processed to generate "predictive analytics" suitable for use to predict the likelihood of future events or the attributes associated with asset failures. Use of predictive analytics can allow an organization to better ensure efficient operation of assets or groups of assets by collection and analysis of available historical data to forecast upcoming events in an effort to enhance future operating procedures. When processed into actionable predictions using predictive analytics, the collected historical data can be useful to assess remaining useful life (RUL), probability of failure, conditional trending, or any other arbitrarily defined feature in one or more assets operating in an environment, with the intended result being elevated efficiency and effectiveness in an organization's processes over the short and long term.

With the increased availability of vast amounts of data and attendant improvements in computing power, predictive analytics methodology improvements have arisen. For example, US Patent App. Publication No. 2016/0350671, the disclosure of which is hereby incorporated by reference in its entirety, discloses methodologies to dynamically update predictive models generated from collected historical source data. Such dynamic updating allows predictive models to substantially continuously be re-specified so that information specific to the operation of a system, machine etc. being monitored can be delivered for action thereon. When the delivered information is in the form of predictive maintenance information or the like, dynamic updating better ensures that the most relevant information about the real-time operation of the systems, machines etc. are used for deploying maintenance activity.

As would be recognized, predictive analytics methodologies represent a significant innovation in asset-intensive environments. However, with this proliferation of information (which can be termed "predictive output"), "information overload" can also result. This can mean that even if the information is good, the excessive amount of information may be bad. To this end, a worker can be presented with multiple action reports that would normally be expected to be acted upon in a timely manner. The worker may not be able to act on those action reports in real-time, thus possibly resulting in escalation of the reports or, in extreme circumstances, automatic stoppage of the machine, system etc.

Moreover, action reports, such as notifications generated by predictive analytics methodologies, are based on historical data. Predictive analytics operate under the dual assumptions that historical asset data is accurate and that assets will behave in the future exactly the same way as they have in the past. However, assets may be subject to vagaries that cannot be accounted for using predictions based on historical data. For example, an action report might be delivered to a worker indicating that immediate maintenance is needed on a machine, but the worker may possess specific, real-time knowledge that the machine will be shut down in the near future because the product team associated with the machine is scheduled for a multi-day training event starting the next day. This information, which necessarily cannot be incorporated in historical data because it will happen in the future, allows the worker to continue allowing the machine to operate for a short time because the training event will allow the maintenance event to be conducted when the machine is shut down as a result of the product team being elsewhere for the duration of their training event.

Moreover, if the worker was to shut down the machine for maintenance as directed by the action report generated by the predictive analytics engine, stoppage of the machine would disrupt production, even when the production schedule presupposed that production would continue until the training event commenced. It follows that context-free action, such as that resulting from this example, on the results of predictive analytics reports by a worker can lead to unacceptable problems in the system. Certainly, there are any number of unintended consequences in an asset-rich environment that can result from blind following of a predictive analytics output.

In view of the above, there remains a need for improvements in the usability of predictive analytics methodologies to make them more actionable, efficient and accurate in real-time when such methodologies are deployed in asset-rich environments. Yet further, there exists a need to generate updated information resulting from user-generated information collected during ongoing operation of one or more assets. The present disclosure provides this and other benefits.

SUMMARY

Aspects of the present disclosure are related to improved predictive analytics. Examples of various systems and methods are presented for managing operation of an asset or group of assets of interest.

In various aspects, methods and/or systems can comprise presenting a first generated prediction associated with an operational outcome of interest, comparing the first generated prediction with a plurality of prediction thresholds, presenting a notification to an operator when the comparison indicates that a prediction threshold of interest has been reached or exceeded by the first generated prediction, and incorporating at least a portion of operator-generated input associated with the notification as updated source data in the generation of subsequent predictions. The predictions can comprise a probability value associated with a likelihood that the operational outcome of interest will occur within a defined future period. The notification can provide the operator with information associated with a level of risk that the operational outcome of interest will occur within the defined future period. The operator-generated input can comprise an operator defined selection that includes, e.g., operator input associated with an operator decision that the notification is accurate when applied to the current operation of the asset or group of assets and action on the notification should be scheduled or operator input associated with rejection of the notification, where the second selection results from determination by the operator that, in relation to the current operation of the asset or group of assets, the notification is incorrect or that the notification is correct, but that the operator will not currently schedule action to address the notification.

Additional advantages of the disclosed aspects will be set forth in part in the description that follows, and in part will be apparent from the description, or may be learned by practice of the disclosure. It is intended that all such additional systems, methods, features, and advantages be included within this description, be within the scope of the present disclosure, and be protected by the accompanying claims. The advantages of the disclosed aspects can be realized and attained by means of the elements and combination particularly pointed out in the appended claims. It is to be understood that both the foregoing general description and the following detailed description are exemplary and explanatory only and are not restrictive of the disclosed aspects, as claimed. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 2A and 2B are a flow diagram illustrating an example of managing operation of an asset or group of assets of interest utilizing notifications and operator-generated inputs, in accordance with various embodiments of the present disclosure.

FIG. 2C illustrates an example of outcome horizons, in accordance with various embodiments of the present disclosure.

DETAILED DESCRIPTION

Figure 1:
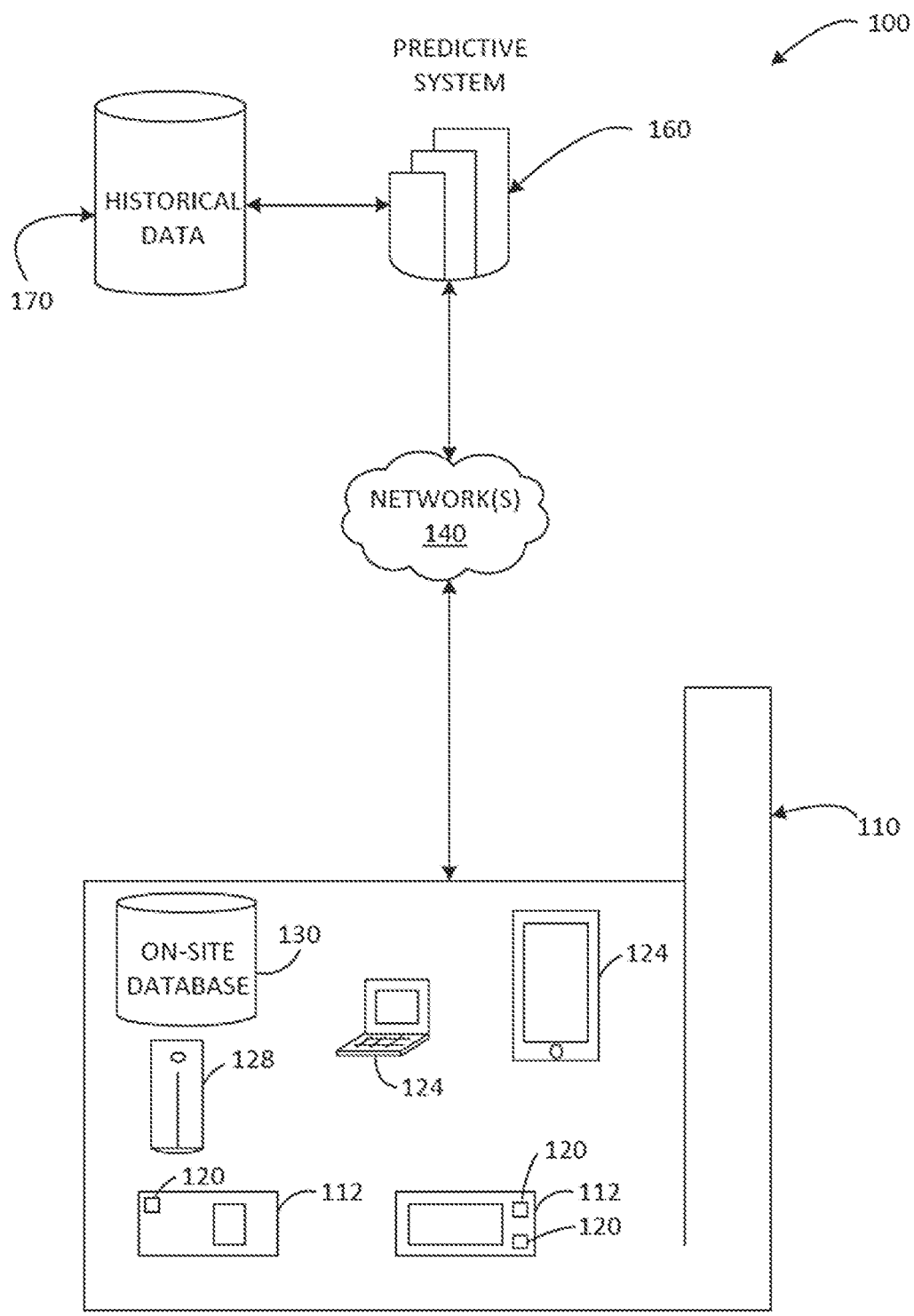
FIG. 1 is a simplified schematic diagram of an example of an environment comprising a predictive system in communication with an operating system, in accordance with various embodiments of the present disclosure.

Disclosed herein are various examples of systems and methods related to improved predictive analytics. Many aspects of the disclosure can be better understood with reference to the drawings presented herewith. The drawings are intended to illustrate the various features of the present disclosure. Moreover, like references in the drawings designate corresponding parts among the several views. While several implementations may be described in connection with the included drawings, there is no intent to limit the disclosure to the implementations disclosed herein. To the contrary, the intent is to cover all alternatives, modifications, and equivalents.

The term "substantially" is meant to permit deviations from the descriptive term that do not negatively impact the intended purpose. All descriptive terms used herein are implicitly understood to be modified by the word "substantially," even if the descriptive term is not explicitly modified by the word "substantially."

The term "about" is meant to account for variations due to experimental error. AH measurements or numbers are implicitly understood to be modified by the word about, even if the measurement or number is not explicitly modified by the word about.

As used herein, a "prediction" is an output from a prediction engine that applies one unit of analysis to a future time period of interest or a specified group of time periods of interest, where such unit of analysis is a predicted probability that a defined event will occur during or prior to the end of such time period. A time period of interest may also be referred to as an "epoch." Such time period(s) or epochs of interest can comprise a variety of durations or events such as tomorrow, the next week, the next 100 km, the next 100 trips, the next shift, the next six shifts, operating hours, megawatt hours, etc.

As used herein, an "asset" can be one or more of a machine, system, or person. A "group of assets" can comprise a plurality of machines, systems or persons, or a combination of both. A system is a combination of machines, apparatus, devices and/or other appropriate components or circuitry which are directed toward the generation of a desired outcome.

In broad constructs, the present disclosure provides improvements in predictive analytics associated with operation of an asset or a group of assets. In this regard, the present disclosure allows operator input to be received in response to notifications derived from predictions generated from predictive analytics methodologies, for example, by a prediction engine. In contrast to prior art predictive analytics methodologies, such operator input can incorporate real-time, "on the ground" knowledge that may not be present in historical source data which is, by definition, based on past events prior to generation of the prediction. In other words, the disclosed methodology incorporates real-time operator-generated input as context to the predictive analytics methodologies. By using operator-generated input as context in combination with historical source data derived from past operation of an asset or group of assets prior to determining the prediction, it has been determined that both the actionability and quality of the predictive analytics, predictions, and notifications can be improved. Such improvements can better ensure superior decision making and successful outcomes associated with an asset or a group of assets in continued operation thereof.

As used herein "context" is the cumulative history that is derived from data observations about entities (people, places, and things). Context can have many definitions and involves many aspects, including location, time of day, temperature, emotional state of the user, orientation, and even the preferences or identities of people within an environment. All of this data can be useful, if it can be accurately obtained and analyzed.

It has been determined that operator-generated input used in conjunction with, or responsive to, predictions generated from a prediction engine can generate enhanced operation and management of an asset or a group of assets. In this regard, a human operator with domain knowledge can receive predictions in the form of notifications to determine whether the prediction is accurate when reviewed in view of the operator-based knowledge and/or contextual assessments of the parameters and characteristics associated with the real-time or substantially real-time operation of the asset or group of assets, or whether an alternate action can be taken. Moreover, inclusion of real-time or substantially real-time operator-generated context derived from operator input in response to the notification as updated source data in the generation of subsequent predictions can further improve subsequent predictions. This "virtuous cycle" obtainable from combining generated predictions from a prediction engine with operator-generated operational context results in tuning of the predictions over time, thus leading to improved overall predictions associated with the operation of an asset or group of assets.

In a first aspect, the disclosed systems and methods for managing the performance of asset or group of assetsutilize one or more predictions comprising a probability that at least one operational outcome of interest will occur at some time in the future. The one or more predictions are generated from a prediction engine, as discussed in more detail hereinafter. Each of the generated predictions can each, independently, be delivered to an operator as one or more notifications, for action by the operator thereupon. Such notifications can be associated with one or more conditions relevant to the performance, health or other operational metrics relevant to the machine, system, device, etc. for which predictions have been generated from the prediction engine.

The one or more notifications are provided to an operator so that the operator can respond (or not respond) to a notification according to an operator-generated decision. A "notification" is a message or warning transmitted to an operator indicating the degree of risk for at least one operational outcome of interest. As set out in more detail herein, the notification is associated with one or more probabilities generated by the prediction engine.

As used herein a "prediction engine" is an automated statistical or machine learning protocol that delivers predictive output on some recurring basis. Such an engine will generally use available source data from sensors, etc., to predict an operational outcome or event of interest. An output generated from or derived by such a prediction engine could be a predicted probability of a defined event occurring, or a notification that is the output of a determination based on one or more predicted probabilities. In one aspect, an example of a prediction engine used to generate the predictions from which notifications are provided to a user is as disclosed in US Patent App. Publication No. 2016/0350671, which was previously incorporated by reference in its entirety.

Broadly, the prediction engine and the associated probabilities generated therefrom can utilize one or a plurality of statistical techniques to define the potential occurrence of an event or operational condition in need of monitoring. Included herein are methodologies for the prediction of a variety of predictions that an operator, and anyone associated with the operator, would have need of predicting—that is, the "operational outcome of interest," which, in non-limiting examples include specific events (e.g., machine failure versus non-failure), maintenance signals (e.g., changes in operational parameters over time), classes of events (e.g., high, medium, or low production yield), resource utilization, operational costs and the detection of patterns within some data specific to some phenomenon (e.g., machine deterioration pattern), operator engagement, operator responsiveness, operator accuracy (or lack thereof), along with many others.

Still further, the "operational outcome of interest" can comprise operational conditions including fault or failures, energy or resource use, production quantity or quality metrics, operational cost metrics, compliance with required performance metrics, or any other operational condition or outcome that might be of interest in operating systems, hardware devices, machines and associated processes. The operational outcome of interest can be associated with at least one available notification. The operational outcome of interest can also be associated with a plurality of available notifications.

Yet further, in an optional configuration, a user can configure how all or some of the notifications are delivered. For example, the user can be provided with a list of available notifications that can be made during a future time period of interest, and the user can select or deselect one or more of the potential notifications. If the notifications are selected from the list of available notifications, those selected notifications will be presented to the user during operation of the one or more assets of interest, and those available notifications that are not selected by the user can will not be presented to the user. If the notifications are deselected from a list of available notifications that can be made during a future time period of interest, those deselected notifications will not be presented to the user during operation of the one or more assets of interest, with the remaining notifications being presented to the user. Selection or deselection of the available notifications can be changed from time to time. Information related to the selection or deselection of the available notifications and the users making such modifications can be configured for use as updated source data as discussed further herein.

"Source data" used to generate predictions and the subsequent notifications comprise input data generated from or associated with past or near past operation of an asset or group of assets prior to generation of the prediction. Such source data can be derived from information obtained during the operation of an operating system, hardware devices, machines and/or associated processes being monitored, in part or as a whole, or it can comprise information that is specifically associated with an asset or group of assets included with or associated with the asset(s) in need of monitoring. Still further, at least a portion of the "source data" can be generated from collection of performance and/or operational metrics associated with a person or persons involved in or with operation of the system, hardware device, machine and/or associated processes, where such person or persons can also be included under the general description of asset(s).

The predictions generated from the prediction engine that are the basis for the notifications herein will be associated with the probability, or in some frameworks, one or more risk assessments, that some operational event of interest will occur at some time in the future. In relation to such probability or risk assessment, the one or more notifications can be provided, where such notifications, and the frequency thereof, can be in relation to both pre-defined rules and operator-generated responses to such delivered notifications.

Significantly, while a first generated probability derived from the prediction engine may indicate at least one operational outcome of interest, such as a machine or system failure, is likely to occur, and that corrective or other action should be taken to prevent the event from occurring, application of operator-based context-specific evaluation by the operator may result in a decision to delay such action or even to override any action from being taken altogether, where such action or lack thereof is associated, at least in part, by operator-generated response to the notification. In this regard, the operator can perform actions associated with acting on the notification, suppressing/ignoring the notification, or rejecting the notification. Such responses, and the circumstances surrounding such responses, can be configured for use as source data to be utilized in subsequent predictions generated from the prediction engine, as well as subsequent notifications generated therefrom.

In some aspects, some context-specific information can be provided automatically for inclusion in source data that is used to generate predictions relevant to the operation of the assets or groups of assets. For example, current and future weather information can be incorporated as source data, so as to provide temperature context information. This type of information, when included along with historical operational data, can enhance the accuracy of predictive analytics, such as by allowing behavior of the asset(s) to be aligned with historical temperatures to be aligned with current temperatures that may be relevant under current operational aspects. However, such added historical context information is different from the operator-generated context information that is provided in conjunction with the operator being presented with a notification associated with a prediction that an operational outcome of interest is likely to occur (or not occur).

When the at least one available notifications or, in some aspects, a plurality of available notifications, are presented to a user (or operator), the user can execute decision making on the presented notifications. Such decision-making can comprise acceptance of the notification (e.g., "the notification is true at this time"), rejection of the notification (e.g., "the notification is false at this time"), or watching of the notification (e.g., "the notification is true, but does not need to be acted on at this time," or "it is not clear whether the notification is true at this time"). Information associated with user (or operator) decision-making on the presented notifications can be configured for use as updated source data. Moreover, information regarding user decisions, in this or other contexts, can be used to monitor user activity and, if appropriate, be applied in training or management of human assets.

In accordance with the present disclosure, the prediction engine can be configured to generate predictions that an operational outcome of interest will occur within or by a future time period of interest (or epoch), for example, from hour to hour, day to day, month to month, among temperature ranges, shift durations, during a plurality of shifts, during projects, during trips or a plurality of trips, traveled distances, between maintenance events, between and among operators or teams of operators, by a certain time, by a certain date, by the time a new staff starts work, amount of output generated by the asset or the like. Such predictions are, at least in part, generated by the collection and analysis of historical operational data associated with an asset or group of assets prior to generation of that prediction. The disclosed methodology herein further incorporates operator-generated information associated with the real-time or substantially real-time operation of the assets or group of assets as source data to provide updated historical source data for subsequent predictions, as described herein.

Such operator-generated information can incorporate, at least in part, an assessment of the risk associated with an available notification. As would be recognized, the risk will be relative to a given use case. The level of risk associated with an operational outcome of interest or an event will vary depending on the specific circumstances, for example, the degree of risk that the operational outcome or interest or event might give rise to in a particular situation. A user may adjust the presentation of notifications or the predictive output from which the notifications are generated for a given prediction use case based on some user determination or decision making that takes into account the costs associated with a negative, the rewards of a true positive, and an acceptance level for the receipt of one or a plurality of available notifications. These parameters can be varied over time as operational, economic, scheduling, and/or other conditions may change over a time period.

The systems and methods herein can also provide utility in managing notifications associated with predictions generated from prediction engines where source data is associated with the operation or performance of industrial equipment. For example, an operator or user who is receiving notifications in real-time about one or a plurality of pieces of industrial equipment, can be provided with notifications associated with the operation or performance of the equipment that could affect the future operation of the machine or on the environment in which the machine is operating. If the person tasked with monitoring the industrial equipment possesses context-specific information about the operation or performance of the industrial equipment during operation thereof, the person can choose to respond (or not respond) to the notification. Such user-generated input information is configured for use in subsequent predictions. The variety of industrial equipment that can be monitored and in which such monitoring can be improved or enhanced using the systems and methods herein may be varied. As such, the previous example is not meant to be limiting but, rather, should be interpreted as being expansive.

Yet further, the systems and methods herein can also provide utility in managing notifications associated with predictions generated from prediction engines where source data is associated with the operation of or outcomes associated with industrial processes. For example, an operator or user who is receiving notifications in real-time about an industrial process in need of monitoring can be provided with notifications associated with the operation of that process. If the person tasked with monitoring the industrial process possesses context-specific information about the process during operation thereof, the person can choose to respond (or not respond) to the notification. Such user-generated input information is configured for use in subsequent predictions. The variety of industrial processes that can be monitored and in which such monitoring and outcomes associated therewith that can be improved or enhanced using the systems and methods herein may be varied. As such, the previous example is not meant to be limited but, rather, should be interpreted as being expansive.

The systems and methods herein can also provide utility in managing notifications associated with predictions generated from prediction engines where source data associated with machine behaviors. For example, the systems and methods herein can be used to provide notifications regarding machine behaviors. An operator or user who is receiving notifications in real-time about one or a plurality of machine behaviors can be provided with notifications associated with the machine's behavior that could affect the operation of the machine or on the environment in which the machine is operating. If the person tasked with monitoring the machine possesses context-specific information about the machine's behaviors during an operation thereof, the person can choose to respond (or not respond) to the notification(s). Such user-generated input information is configured for use in subsequent predictions made by the prediction engine. The varieties of machine behavior monitoring that can be improved or enhanced using the systems and methods herein may be varied. As such, the previous example is not meant to be limited but, rather, should be interpreted as being expansive.

In a further aspect, the systems and methods herein can also provide utility in managing notifications associated with predictions generated from prediction engines where source data is associated with signals pointing to a likelihood that machine fatigue may occur at some future time period of interest. An operator or user who is receiving notifications in real-time about machine fatigue indicators can be provided with notifications associated with the machine's operation or output associated therewith that could have an effect on the propensity of the machine or one or more components of the machine to exhibit fatigue. If the person tasked with monitoring the machine possesses context-specific information about the indicators of machine fatigue during an operation thereof, the person can choose to respond (or not respond) to the notification(s). Such user-generated information is configured for use in subsequent predictions made by the prediction engine. The variety of machine fatigue indicator monitoring that can be improved or enhanced using the systems and methods herein may be varied. As such, the previous example is not meant to be limited but, rather, should be interpreted as being expansive.

The systems and methods herein can also provide utility in managing notifications associated with predictions generated from prediction engines where source data is associated with production yields. For example, someone who is receiving notifications in real-time about one or more production yields in need of monitoring can be provided with notifications associated with the resulting yield. If the person tasked with monitoring the production yield possesses context-specific information about the nature and content of the process that generates the product having the yield during operation thereof, the person can choose to respond (or not respond) to the notification. Such user-generated input information is configured for use in subsequent predictions. The variety of production yields that can be monitored and in which such monitoring and outcomes associated therewith that can be improved or enhanced using the systems and methods herein may be varied. As such, the previous example is not meant to be limited but, rather, should be interpreted as being expansive.

The systems and methods herein can also provide utility in managing notifications associated with predictions generated from prediction engines where source data is associated with the operation or performance of telecom equipment. For example, an operator or user who is receiving notifications in real-time about one or a plurality of pieces of telecom equipment can be provided with notifications associated with the operation or performance of the equipment that could affect the future operation of the telecom equipment is operating. If the person tasked with monitoring the telecom equipment possesses context-specific information about the operation or performance of the telecom equipment, the person can choose to respond (or not respond) to the notification. Such user-generated input information is configured for use in subsequent predictions. The variety of telecom equipment that can be monitored and in which such monitoring can be improved or enhanced using the systems and methods herein may be varied. As such, the previous example is not meant to be limited but, rather, should be interpreted as being expansive.

The systems and methods herein can also provide utility in managing notifications associated with predictions generated from prediction engines where source data associated with medical diagnoses, treatment and/or health outcomes. In this regard, the operator or user, such as a healthcare provider can be provided with a plurality of notifications associated with a patient in need of treatment. In response to such notifications, the healthcare provider can respond (or not respond) to such data using context specific information obtained from the providers real time or substantially real time assessment of the patient's condition, the availability of other providers, supplies, etc. The provider or operator-generated input information so generated is configured for use in source data for use in the prediction ermine for generation of further predictions and associated notifications in relation to a patient health outcomes.

The systems and methods herein can also provide utility in managing notifications associated with predictions generated from prediction engines where source data associated with diagnoses, treatment and outcomes associated with the treatment of a patient with pharmaceutical products or materials. In this regard, the operator or user, such as a healthcare provider, can be provided with a plurality of notifications associated with a patient in need of treatment. In response to such notifications, the healthcare provider can respond (or not respond) to such data using context specific information obtained from the provider's real time or substantially real time assessment of the patient's condition, the availability of other providers, supplies, etc. While the notifications could signal that the provider continue to administer the pharmaceutical, when observing the patient, the provider can determine that the dosage should be changed or that the pharmaceutical regime should be changed or stopped. The provider or operator-generated input information so generated is configured for use in source data for use in the prediction engine for generation of further predictions and associated notifications in relation to a patient pharmaceutical dosages and outcomes. The systems and methods herein can also be used in research studies or the like.

Yet further, the systems and methods herein can also provide utility in managing notifications associated with predictions generated from prediction engines where source data associated with human behaviors. For example, the systems and methods can be used to provide notifications regarding human behaviors associated with driving, flying or operating machinery. Someone who is monitoring a driver in real-time can be provided with notifications associated with the driver's behavior that could have an effect on the operation of the vehicle. While notifications associated with head nodding by the driver could lead to a prediction that the driver is possibly falling asleep, if the person monitoring the driver possesses context-specific information about the driver that the driver is afflicted by Parkinson's Disease, notifications associated with predictions that the driver may be falling asleep can be ignored or watched, for example. Such user or operator-generated input information is configured for use in subsequent predictions generated from the prediction engine. The variety of human behavior monitoring that can be improved or enhanced using the systems and methods herein may be varied. As such, the previous example is not meant to be limited but, rather, should be interpreted as being expansive.

Yet further, the systems and methods herein can also provide utility in managing notifications associated with predictions generated from prediction engines where source data associated with educational outcomes. For example, the systems and methods can be used to provide notifications regarding outcomes associated with teaching of students or training events. An operator or user who is monitoring a student in real-time can be provided with notifications associated with the student's behavior that could have an effect on the student's learning and mastery of the material. While notifications may indicate that the student is sending signals that would generally indicate that the student is not learning the materials, if the person monitoring the student possesses context-specific information about the student such as a temporary personal issue being faced by the student that is making him less engaged with the materials, notifications associated with predictions that the student may not be adequately learning the material can be ignored or watched, for example. Such user or operator-generated input information is configured for use in subsequent predictions generated from the prediction engine. The variety of educational or training monitoring that can be improved or enhanced using the systems and methods herein may be varied. As such, the previous example is not meant to be limited but, rather, should be interpreted as being expansive.

The systems and methods herein can also provide utility in managing notifications associated with predictions generated from prediction engines where source data is associated with agricultural outcomes or production yields related to crops, livestock, dairy products, livestock or the like. For example, an operator or user who is receiving notifications in real-time about an agricultural outcome or production yield in need of monitoring can be provided with notifications associated with the outcome or yield of interest. If the person tasked with monitoring the outcome or yield possesses context-specific information about the nature and content of the agricultural process, the person can choose to respond (or not respond) to the notification. For example, a farmer can review the condition of his crops, and decide to delay harvesting, even though the farmer is being provided with notifications indicating that harvesting should begin. Such user or operator-generated input information is configured for use in subsequent predictions. The variety of agricultural outcomes etc. that can be monitored and in which such monitoring and outcomes associated therewith that can be improved or enhanced using the systems and methods herein may be varied. As such, the previous example is not meant to be limited but, rather, should be interpreted as being expansive.

Still further, the systems and methods herein can also provide utility in managing notifications associated with predictions generated from prediction engines where source data is associated with the operation or performance of financial markets. For example, an operator or user who is receiving notifications in real-time about one or plurality of information or events associated with financial markets or outcomes associated therewith can be provided with notifications associated with the outcome thereof during the period of interest. If the person tasked with monitoring the financial markets possesses context-specific information about the operation or performance of the financial markets or a specific aspect of a financial market during operation thereof, the person can choose to respond (or not respond) to the notification. Such user or operator-generated input information is configured for use in subsequent predictions. The variety of financial markets or finance events that can be monitored and in which such monitoring can be improved or enhanced using the systems and methods herein may be varied. As such, the previous example is not meant to be limited but, rather, should be interpreted as being expansive.

The systems and methods herein can also provide utility in managing notifications associated with predictions generated from prediction engines where source data associated with sports outcomes. In this regard, the operator or user, such as a person who is betting on a sporting event or someone who is managing a sports betting operation can be provided with a plurality of notifications associated with the outcome of one or more sporting events. In response to such notifications, the person can respond (or not respond) to such data using context specific information obtained from one or more conditions generated in real time or substantially real time. The provider or operator-generated input information so generated is configured for use in source data for use in the prediction engine for generation of further predictions and associated notifications in relation to one or more outcomes of interest for one or plurality of sporting events of interest.

In further aspects, the systems and methods herein can also provide utility in managing notifications associated with predictions generated from prediction engines where source data associated with the probability that one or one or more weather events or conditions may occur (or not occur) in the future. In this regard, the operator or user can be provided with a plurality of notifications associated with the one or more weather events or conditions of interest. In response to such notifications, the person can respond (or not respond) to such data using context specific information obtained from one or more conditions associated with the occurrence of a weather event or condition of interest generated in real time or substantially real time. The provider or operator-generated input information so generated is configured for use in source data for use in the prediction engine for generation of further predictions and associated notifications in relation to one or more weather events or conditions of interest.

Yet further, the systems and methods herein can also provide utility managing notifications associated with predictions generated from prediction engines where source data is associated with retail and marketing operations. For example, an operator or user who is receiving notifications in real-time about one or more retail and marketing processes or events can be provided with notifications associated with such events or processes. Such on the ground information can be used to adjust the prices of products during a sale if weather reduces the number of customers so as to, for example. If the person tasked with monitoring the retail and marketing operation or event possesses context-specific information about the operation or performance of the retail and marketing during operation thereof, the person can choose to respond (or not respond) to the notification. Such user or operator-generated input information is configured for use in subsequent predictions. The variety of retail and marketing operations or event that can be monitored and in which such monitoring can be improved or enhanced using the systems and methods herein may be varied. As such, the previous example is not meant to be limited but, rather, should be interpreted as being expansive.

The systems and methods herein can also provide utility in managing notifications associated with predictions generated from prediction engines where source data associated with the probability that one or astronomical phenomena may occur (or not occur) in the future. In this regard, the operator or user can be provided with a plurality of notifications associated with the astronomical phenomena of interest. In response to such notifications, the person can respond (or not respond) to such data using context specific information obtained from one or more conditions associated with the occurrence of an astronomical outcome of interest generated in real time or substantially real time. The provider or operator-generated input information so generated is configured for use in source data for use in the prediction engine for generation of further predictions and associated notifications in relation to one or more astronomical outcomes of interest.

In some aspects, the present disclosure allows the operator to make real-time or substantially real-time decisions associated with the quantity, periodicity, and duration of notifications generated from predictions delivered by the prediction engine. In this regard, an operator having domain knowledge and operational experience with an asset or a group of assets may not need or desire repetitive notifications when at least one notification about the probability that an operational outcome of interest may occur in the future. Yet further, raw (that is, as-presented) notifications generated from the probabilities derived from the prediction engine that are based primarily on an analysis of historical source data may be seen by the on-the-ground operator to provide redundant and/or not totally accurate information. Additionally, the probability that an operational outcome of interest may occur may fluctuate for a period of time, thus resulting in confusing or ambiguous notification. For example, on a day to day basis, the predictions can be inconsistent, such as going from "low risk," to "high risk," to "medium risk" etc. The operator who has knowledge of the actual operation of the asset or group of assets can often deliver enhanced information and insights over that which can be obtained from historical source data generated from past operation of the asset(s).

In some aspects, the present disclosure delivers at least one notification to the operator for action thereupon. Such initial delivery of the at least one notification is based on the generation of at least one probability value associated with the likelihood that an operational outcome of interest will occur in a defined future period or epoch. The at least one probability value can be generated from the prediction engine as discussed elsewhere herein.

In use, the generated at least one probability value is compared with each of a plurality of prediction thresholds. Such prediction thresholds of interest are generated by establishing a plurality of prediction ranges wherein each of the plurality of prediction ranges each, independently, comprises an upper and a lower value. Each of the upper and lower values are associated with a defined risk level associated with continued operation of the asset or group of assets of interest. For example, risk categories of "low/no risk," "moderate risk," "high risk," or "extreme risk," can be assigned, where such risk categories are defined in relation to the likelihood (or lack thereof) that an operational outcome of interest will occur in a future period or epoch. When a defined risk category or a prediction threshold of interest is reached or exceeded by a generated probability, at least one notification can be presented to the operator.

For example, if a range of risk categories and associated prediction thresholds associated with the upper value in each range has been defined for operation of a machine as less than 0.65=no risk; equal to or greater than 0.65 and less than 0.80=moderate risk; equal to or greater than 0.80 and less than 0.95=high risk; and equal to or greater than 0.95=extreme risk, a notification can be provided to a user or operator for action thereon when a prediction threshold of interest has been reached or exceeded. For example, since there is an assigned level of "no risk" when the probability is <0.65, notification of the operator can be suppressed when the prediction engine returns a probability of <0.65. Alternatively, notification to the operator can be suppressed manually by the operator when the probability is <0.65. When the returned probability is ≥0.65 and <0.80, the operator can be notified when any value in that range is reached. The operator can manually suppress the notification until a further probability value is reached, such as when the prediction threshold defined by the transition of the probability from "moderate risk" to "high risk" is reached or exceeded for one or more notification periods. In some implementations, an intermediate threshold between the two prediction thresholds can be defined by the operator such that the notification is suppressed until the operator defined intermediate threshold is reached. Similarly, notifications can be suppressed until the "high risk" or "extreme risk" categories are reached or exceeded, in accordance with the notification parameters discussed elsewhere herein.

One or more of the prediction thresholds can be of interest in a particular situation, and therefore can be selected by either or both of a user or a computer. For example, "moderate risk," "high risk," or "extreme risk" prediction thresholds and the associated probability values conforming to the risk categories, can each, independently, be of interest. The attendant prediction thresholds will accordingly each, independently, comprise "prediction thresholds of interest" in various implementations. The prediction thresholds can be adjusted as operational, economic, scheduling, and; or other conditions related to the predicted operational outcome or event of interest may change over a time period of interest.

In use, there can be a minimum of two prediction thresholds or categories, such as "less likely," or "more likely," where such thresholds or categories can be associated with probability values generated by the prediction engine, such as less than 0.50 and equal to or greater than 0.50, or the like. Typically, at least 3 or 4 prediction thresholds or categories can be used, such as, for example, the low, moderate, high, and extreme categories mentioned previously. A variety of other category names can be assigned to the operational outcomes of interest without changing the nature and scope of the claimed aspects.

A prediction threshold of interest to which the generated probabilities are compared can be selected in accordance with pre-defined criteria. For example, a prediction threshold can become "of interest" by selection and setting, either automatically or manually by an operator or user, of a threshold level in software processes associated with the operation of the processes described herein. When a prediction threshold of interest is reached or exceeded, for example, if a risk level transitions from "low risk" to "moderate risk," or from "moderate risk" to "high risk," or from "high risk" to "extreme risk" (where such risk categories are defined in relation to probability ranges as discussed previously), one more notifications can be presented to the operator for action thereupon. In this regard, a notification can be presented to an operator for review and action thereupon when a comparison of the first generated prediction to a plurality of prediction thresholds indicates that at least one prediction threshold of interest has been reached or exceeded. As used herein, "the first generated prediction" is a prediction delivered in native form (using historical source data) by the prediction engine prior to review and action thereupon by an operator. Subsequently generated predictions comprise predictions generated using updated source data that incorporates operator-generated input as discussed elsewhere herein.

Alternatively, the one or more prediction thresholds of interest, as well as any range of probability values defining the upper and lower limits of the ranges associated with each of the prediction thresholds, can be modified, adjusted or varied by an operator, where such modification, adjustment, or varying can be associated with operator-specified levels or parameters. As would be recognized, the presented at least one notification provides the operator with information associated with a level of risk that the operational outcome of interest will be likely to occur within a defined period of interest in the future. In response to the notification, the operator can provide input that enables the raw predictions generated by the prediction engine to be evaluated and, optionally, modified by the operator based upon context-specific knowledge that the operator holds that is substantially independent of the source data used to generate the first prediction from the prediction engine.

For example, an operator with actual knowledge of operational parameters or characteristics of an asset or group of assets of interest can decide that a previously defined prediction threshold is too conservative, and, as such, may be associated with inaccurate, ambiguous, unhelpful etc. notifications related to the asset(s). The operator can then adjust the prediction thresholds and, therefore, any attendant notifications so as to provide more context-specific information about the operational outcome of interest, where the notifications related thereto can provide better/more actionable information to the operator. Such operator-generated input can be incorporated as updated source data to train (or "tune") subsequent predictions generated by the prediction engine.

As an example of the context-specific knowledge that can be provided by the operator, the different operation of two ostensibly identical machines, denoted "System 1" and "System 2," can be addressed by the operator to enhance the value of the information provided by the prediction engine. In many situations, such ostensibly identical machines can function differently in substantial aspects when in use. For example, System 1 may normally run hotter and vibrate more than System 2. Notably, such context-specific knowledge may be known by an operator who works in proximity of Machine 1 and Machine 2, but source data collected from sensors associated with the machines may not competently acquire and process such subjective knowledge. Accordingly, the predictions generated from the prediction engine that use standard operational parameters, such as anomaly detection or rules based systems, may signal a failure is likely from System 1, even though it is not subject to failure because of its specific operational parameters or characteristics. Such operator-generated context-specific information may not be discernable from historical source data, which, in its usual form, comprises only objective data derived from past machine operation, and not operational context that can be observed by an on-the-ground operator. Predictions generated using historical source data derived from operation of these machines may therefore not be able to discern the operational differences in each machine, whereas an operator can provide observed context to the predictions. Presentation of a notification related to risk assessment to a user or operator for review and action thereupon can permit subjective (that is, operator-generated) information about the operation of the asset or group of assets of interest can allow the operator to tune the predictive output to enhance its value in use, and such additional operator-generated information can be used as updated source data to enhance the quality and value of subsequent predictions generated from the prediction engine that will be used in relation to the operational outcome of interest.

When the asset or group of assets of interest include the performance of a person/worker, a first prediction could be generated from the prediction engine that the person's performance is sub-par in relation to his peers, and that the person's activities associated with this asset or group of assets are of lower quality and/or generate a higher degree of risk. However, the operator reviewing the prediction may possess real-time knowledge about the person's performance, whereby the prediction may require modification. For example, a prediction and related notification can be generated that the work done by a worker is completed faster than average, but the operator may possess knowledge that the asset or group of assets was involved in training another worker, so that the speed at which a task was completed was not too fast, but rather, had additional staff associated therewith. Armed with this context-specific knowledge, which is generated in real-time or in substantially real-time, an operator can respond to a notification appropriately, where such appropriate operator-generated response can be one of action, inaction or partial action, where such action is associated with managing the operational outcomes of interest for the asset or group of assets.

In some aspects, there is less than an about 1:1 relationship between notifications and predictions generated from the prediction engine. In prior art predictive analytics addressing system, machine, hardware, or asset or group of assets operation, raw predictions are generally transformed into notifications. However, not all such raw predictions may be relevant to an operator in a particular situation. An operator may become fatigued by or inured to frequent notifications that do not need to be acted upon. Such context-free notifications also may not accurately represent the "on the ground" operational parameters associated with the system, machine, or asset or group of assets. By incorporating operator-defined logic and decision-making with the predictions objectively generated from the prediction engine from historical source data and, perhaps, non-operator generated context data (e.g., weather conditions), the quality of notifications and actions made thereupon can be enhanced and improved. Moreover, the information generated from such combination of predictions generated from prediction engines with operator-generated context-specific information can be further incorporated into subsequent predictions to further improve the quality and usability of notifications provided at a later time.

The operator input associated with a level of risk can comprise one of at least two operator selections. Such operator input is receivable in response to at least one notification associated with an operational outcome of interest in relation to the asset or group of assets, for example whether the outcome of interest is likely to occur (or not to occur), e.g., within a time period or epoch. As discussed previously, the notification can be presented to the operator when the comparison step indicates that at least one prediction threshold of interest has been reached or exceeded by a first generated prediction.

The first of the at least two operator selections can comprise eliciting and/or receiving operator input associated with an operator decision that the notification is accurate when applied to the current operation of the asset or group of assets, and that an action on the notification should be scheduled. For example, the notification can indicate that, e.g., a machine is at "moderate risk" of failure. In response to the notification, the operator can confirm, such as by validating the notification within an associated user interface of a software program, that the notification is correct. Action can then be taken to service or otherwise correct the operation of the machine so that failure will not occur. Similarly, if the notification indicates that an asset or group of assets is not performing up to requirements or expectations, the operator can confirm that such notification is correct, and corrective action may be taken. Such scheduled action can include one or more of preparing a work order, stopping or slowing operation, performing maintenance, scheduling maintenance, bringing on additional staffing, or the like.

The second of the at least two operator selections can comprise operator input associated with rejection of the notification. Such rejection of the notification can be in relation to a decision by the operator that the prediction associated with the notification is not correct as applied to the current or future operation of the asset or group of assets. Alternatively, rejection of the notification can result from a decision by the operator that the prediction associated with the notification is correct, but that the operator will not take action to address the operational conditions of the asset or group of assets relevant to the notification at the current time. In some cases, the operator cannot substantially immediately take steps to take action to address the operational conditions of the asset or group of assets relevant to the notification. When the operator input is in relation to a decision by the operator that the prediction cannot be acted on at that time, the notification can be suppressed or re-routed to a second operator.

When the notification is rejected even though the operator believes that the notification is correct when viewed in the context of the current and future operation of the asset or group of assets of interest, the notification can be suppressed for a period of time for a variety of reasons as discussed herein. Yet further, the operator can re-route the notification for review by a supervisor or by someone with more specific knowledge about the operational conditions associated with the notification. For example, a notification can be delivered to an operator that, e.g., an HVAC system critical in the operation of a data center may need service soon, that is, the prediction threshold indicating that the HVAC is at risk of failure has been reached or exceeded. The operator tasked with monitoring the operation of the data center can review the notification and see that he needs to route the information about the operation of the HVAC system to an HVAC specialist for review and action thereupon. Such re-routing and any action thereupon by the HVAC specialist can be configured for use as updated source data, thus allowing the prediction engine, and any predictions and subsequent notifications associated therewith to be more accurately presented to the relevant operators. In other words, context-specific actions generated by the operators receiving notifications can be used to train or tune the prediction engine, as well as to generate enhanced notifications associated with continued operation of an asset or group of assets of interest.

Still further, if the operator selection is associated with rejection of the notification, the operator can select a second prediction threshold of interest, such as, for example, by modifying an upper limit of a range associated with a risk level or probability related to continued operation of the asset or group of assets of interest. In this regard, the operator can select a second prediction threshold of interest. Subsequent notifications associated with that prediction can be suppressed by the operator input until the second prediction threshold of interest is reached or exceeded, at which time, the suppressed notification can be made visible to the operator, suppressed again for a period of time, or routed to a second operator for action thereon. If the operator suppresses the notification again, he can also define a further prediction threshold that can serve as a basis for the notification further being presented to the user. Again, all information associated with operator-generated input can be configured for use as updated source data to be used in subsequent predictions.

In addition to the two operator selections, a further operator selection can be provided to generate receivable operator-generated input. In this operator selection, the operator can place the notification in a watch queue for a period of time, where such placement of the notification in the watch queue results from an operator determination that action on the at least one notification can be delayed or suppressed. Such operator determination can be based, at least in part, on the operator's subjective assessment of the real-time or substantially real-time operational conditions associated with the asset or group of assets of interest.

As an example of context-specific operator-generated inputs, a notification may be presented to the operator indicating that service may be needed on, e.g., a machine as a result of source data processed by the prediction engine that generates a probability associated with a prediction threshold signaling that operation of an asset or group of assets of interest may be deteriorating, and that corrective maintenance may be needed immediately. However, an operator may also know that the team assigned to the asset(s) is scheduled for off-site training in the very near future. In such a situation, the operator can incorporate context-specific information to override the direction provided by the notification, for example, "extreme risk" notifications—which could be very strident (e.g., loud or repetitive to ensure that they are not ignored) can then be suppressed for a defined period of time.

To ensure that the operator is held accountable for such overriding of ostensibly important notifications, the operator can be required to submit supporting information as to why the notifications were ignored. When such information is included as training or in association with the tuning of the subsequent predictions, the quality of subsequent predictions can be improved because the prediction engine can incorporate additional context-specific information that would likely not be discernable directly from operational source data. Moreover, data scientists are likely not to hold the specific operational and domain knowledge to build training or other specific context that will affect the nature and quality of the generated notifications, and therefore the value of such notifications in the context of actual operation of the asset or group of assets of interest may be lacking until on-the ground operational input is received, for example.

Information associated with such action or inaction, as well as the underlying decision-making, are suitably configured for incorporation into source data used in the generation of subsequent predictions derived from the prediction engine that can, in turn, be used to deliver further notifications to the operator, where such further notifications provide information about the operational and/or performance conditions of the asset or group of assets. Such real-time or substantially real-time operator-generated information can improve the usability, efficiency and accuracy of predictions generated from prediction engines, as discussed herein.

In a further aspect, the disclosed systems and methods further comprise generation of an outcome horizon for each user notification, wherein each outcome horizon comprises a user-defined period of time that the notification is available for presentation to the user. The outcome horizon can be pre-defined, either manually or automatically, or the outcome horizon can be operator-defined after delivery of one or more of notifications. Still further, a pre-defined outcome horizon can be modified by an operator in accordance with context-specific information known by the operator. The notification associated with a particular outcome horizon can be configured to expire at the end of the outcome horizon. Yet further, the notification associated with a particular outcome horizon can be configured to be suppressed or muted until the expiration of the outcome horizon.

The at least one notification can be configured to be delivered to the operator according to various system or operator-defined preferences. For example, if a prediction threshold is exceeded only one time, and then a lower prediction threshold is not exceeded, a notification can be suppressed or muted until such time that the selected prediction threshold is exceeded for a plurality of notification events. For example, a notification can be generated if a defined prediction level of "moderate risk" is generated for a number of recurring periods (e.g., for 1 or 2 or 3 or 4 days), where a notification is not generated until such number of predictions is generated, or the notification can be suppressed or muted until there a defined number of delivered predictions associated with a one or more prediction thresholds of interest. Such notification delivery, suppression, or muting can be in accordance with pre-defined rules or can be associated with operator-generated input delivered in response to real-time or substantially real-time operational context obtained and acted upon by the operator. With respect to the latter, an operator can manually define one or more rules to indicate when notifications should be provided, where such defined rule(s) can be used in the generation of subsequent predictions unless and until the rule(s) are subsequently modified by the operator in response to or as a result of later generated information obtained from further operation of the asset or assets of interest. Again, such subsequently generated operator input is configured for, and can be used for, updated source data used in the prediction engine to generate probabilities and notifications, as described elsewhere herein.

If the operational outcome of interest occurs prior to the end of the outcome horizon, then the notification can be identified as a "positive prediction information." If the operational outcome of interest does not occur prior the end of the outcome horizon, then the notification can be optionally identified as a "negative prediction information." For example, if an action is carried out before the end of the outcome horizon that corrects for the predicted outcome of interest, then the prediction is not necessarily false because of the lack of an occurrence. Thus, the operator or user can choose to identify the notification as something other than "negative prediction information." For instance, if the action included maintenance that discovered and replaced a failing component, then the notification could be identified as a "positive prediction information" even though the operational outcome of interest did not occur prior to the end of the outcome horizon. Such "negative prediction information," and "positive prediction information" is configured for incorporation into the prediction engine as updated source data to thereby generate subsequent probabilities, predictions, and notifications etc.

Notifications can optionally be configured to incorporate a lead time associated with a particular action resulting from a notification to better ensure that scheduled operations will not be interrupted. "Lead time" is a source data attribute that incorporates supplemental information relevant to the management of the asset of interest. Such supplemental information may include scheduling information associated with a maintenance operation for the one or more assets of interest. For example, if a notification relates to a need to provide service to a machine, but parts will need to be ordered and obtained to affect the required service, the notification can be modified to incorporate the extra time needed to obtain the parts; in other words, a lead time can be incorporated into the level of risk and/or type of notification presented to the user. Still further, lead time can be associated with the identification and/or availability of a worker who is needed to conduct a maintenance or a repair operation. Information associated with lead time can be incorporated as an aspect of historical source data, or it can be supplied by the operator in association with decision making related to available notification(s). In either case, lead time comprises a data attribute that can be incorporated into available notifications.

A prediction may indicate that there is a "moderate risk" that the machine will fail. However, the parts needed to service the machine to prevent failure may require substantial lead time before delivery thereof. In such a situation, the notification can be trained by incorporating context-specific operator-generated information to elevate the notification to a higher degree of risk so as to better gain the attention of the operator. Alternatively, such lead time information can otherwise be incorporated into instructions associated with the processes herein. For example, if a "moderate risk" notification is generated as a result of the predictions generated by the prediction engine, instructions can be activated to direct the necessary parts, labor, downtime scheduling, etc. to be generated so as to allow the necessary repair to be effected efficiently and effectively, and substantially without interruption of scheduled operations.

In some embodiments, "source data" can be generated by or derived from one or more sensors associated with the asset or assets of interest or with sensors associated with one or more hardware devices or machines that are themselves associated with the asset(s). Still further, "source data" as used herein can be derived from information available from systems, situations or occurrences proximate to or associated with operation of the asset(s) and/or the operating system, hardware device, or machine in need of monitoring. For example, "source data" can be derived from any Asset Management System (EAM), maintenance-related outputs (oil analysis, vibration, operational speed, run temperature, voltage etc.), maintenance tasks carried out, employee training records, employee attendance records, safety incident reports, calendars (e.g., holiday occurrences), external weather, environmental temperature proximate to the operating system (such as the temperature of a facility or piece of equipment in which the operating system etc. is incorporated), recall or service reports for the operating system or any machine or device incorporated therein, or any other available data input from which information can be collected for sorting and analysis according to the aspects herein. When such information is related to past operations, it can be utilized as historical source data. Yet further, the asset(s), operating system, hardware device, machine and/or user can be queried after generation of the prediction, or after the outcome horizon, to generate a confirmation or validation that the predicted operational outcome of interest did occur (or did not occur), where such confirmation or validation can be input for use as source data to further improve the accuracy of the predictive models herein.

For example, one might have relevant data on motors (e.g., failure history) with a desire to predict the probability of motor failure within a 1-hour prediction window using source data from data sources associated with the hardware device or machine. Such prediction within a 1-hour window, or any other appropriate time window, can enable the machine or hardware device in which the motor is embedded to be taken off line for maintenance or to allow the motor or machine to be adjusted while in use, depending on the type of data being reported. If one or more sensors associated with the motor reports a high temperature reading, it may be prudent or even necessary to remove the motor from service, or it could be possible to slow the motor down in order to reduce the temperature, depending on the circumstances. Source data, can be obtained by recording on a periodic basis (e.g., once per hour) for each motor's average RPM, vibration, temperature, and amperage, for example. Source data can also include information derived from or developed in association with phenomena proximate with and related to the motor, the machine or hardware device in which is it embedded or the operating system in which it operates. In this regard, the source data can include environmental temperature, the condition of the area of which it is operating (e.g., the railroad tracks if it is a locomotive motor), information relevant to the person operating the machine (e.g., a train engineer), information relevant to the operating system itself (e.g., age of the train, number of cars pulled by the locomotive, maintenance records), and information about other machines or hardware devices associated with the operating system (e.g., motors or systems associated with other parts of the train being pulled by the locomotive motor). In short, the present disclosure enables a wide variety of seemingly disparate information to be used to generate predictions so as to improve the ability to predict operational conditions of interest of an operating system, hardware device, machine, or other asset.

In some embodiments, a prediction of an operational outcome of interest can be provided by way of a signal to an operator to instruct or otherwise notify him that the operating system, hardware device, or machine should be removed from service either immediately or in a short time thereafter. Yet further, a risk of the operational outcome occurring can be indicated. Alternatively, an operational condition prediction can be provided by way of a signal to an operator that the operation of the operating system, hardware device, or machine should be modified to affect the outcome of the predicted operational condition. In further embodiments, an operational condition signal associated with a prediction can be utilized in a rules engine embedded in operational software that provides instructions for the operating system, hardware device, or machine.

In some embodiments, the systems and methods of the present disclosure show utility in predicting a variety of operational outcomes of interest, such as those associated with industrial machines, industrial processes, asset failure, asset health, operational conditions, and the compliance of asset operations. As a result, the systems and methods of the present disclosure can, in non-limiting examples, provide benefits such as reducing unplanned downtime and associated revenue losses, allow for repair of machines, cost reduction, production improvements, quality control, resource reduction for operating systems, hardware devices or machines prior to an operational outcome of interest event occurring, as well as providing insights into the causes of the outcome of interest in the first place.

In some embodiments, source data streamed from one or more sensors associated with the asset(s), operating system, hardware device, or machine can be used as source data. Batch data or other forms of data not generated from sensor sources can also be used. For example, data representing maintenance history (planned and unplanned), movement information; location, etc. may not be recorded at regular intervals. More specifically, the systems and methods herein can incorporate maintenance records generated regularly (e.g., hourly, weekly, etc.) while other sensor data may be delivered in real time or near-real time. In this instance, if predictions are to be generated at an interval shorter in duration than batch data are delivered, the solution can utilize substantially all data on hand and update the approach each time new data are incorporated and update the predictive output accordingly. Employee information, environmental conditions, or other forms of historical information may be incorporated in spreadsheet form, for example.

Referring now to FIG. 1, shown is a simplified schematic diagram of an environment 100 from which predictions and, subsequently, notifications, can be generated. Environment 100 comprises an operating system 110 such as, e.g., a manufacturing setting or a mobile system (in one aspect, a train, for example) with one or more assets(s) of interest 112 (e.g., a hardware device and/or machine and/or persons/workers) on which processes may be performed for various purposes such as, for example, processing, manufacturing, transportation, providing services, or the like. In some cases, the operating system 110 can be an asset. The operating system 110 can further include one or more sensors 120 that can be used to collect operational data on any suitable aspect of the operating system 110, asset(s) 112, environment 100, product and/or unfinished product (e.g., in-situ production samples, work-in-progress, etc.) during operation thereof. Such one or more sensors 120 generate source data that can be used to provide source data for analysis as discussed elsewhere herein.

The one or more sensors 120 can each, independently, be any suitable sensor including, for example, thermometers, hygrometers, pressure sensors, flow meters, vibration sensors, odometers, accelerometers, ammeters, voltmeters, power meters, digital multi-meters, digital imagers, microscopes, distance measurement devices, tackiness detectors, rigidity detectors, stiffness detectors, alignment detectors, pH detectors, GPS locators, combinations thereof, or the like.

Source data generated for generating first predictions, or for combination with operator-generated context-specific information to generate subsequent predictions, where such source data is generated by these one or more sensors 120 will be associated with the specific past or current operation of the asset(s) 112 that operates within the operating system 110 or processes associated therewith. For example, if the one or plurality of sensor(s) comprises a temperature sensor, data will be generated related to temperature readings or behavior of asset(s) 112 (e.g., a machine or hardware device) with which that one or more sensors 120 is associated will be generated during operation thereof. Moreover, each of the one or more sensors 120 can have multiple functionalities so as to generate multiple sets of source data, or one or more sensors 120 can generate a single set of source data that provides information about multiple operating parameters of the asset(s) 112 with which the one or more sensors 120 is associated. In this regard, the one or more sensors 120 can be configured to provide both temperature and vibration information, for example, where the temperature and vibration information can be streamed as separate source data outputs (i.e., temperature data and vibration data), or the information can be combined to provide a unique source data parameter that incorporates both temperature and vibration data into a single source data component for analysis according to the methodology herein.

The one or more sensor(s) 120, in part, provide the historical and operational information that provides the source data that is at least collected, contextualized, and analyzed according to the methodology herein to thereby generate predictions from which notifications are generated. Each asset 112 can be associated with one or more sensors 120, each of which provides source data relevant to one or more features of the operation of asset(s) 112 thereof. Alternatively, or in addition to, the operating system 110 can itself be associated with one or more sensors 120, whereby data regarding the overall operation of the operating system 110 can be generated for use in accordance with the methodology herein.

Each of the one or more sensors 120, in various embodiments, can each, independently, be coupled to one or more controller(s) and/or user device(s) 124 that can receive sensor measurements (e.g., raw measurement data from one or more asset 112), derive additional information therefrom, and/or provide the source data and/or additional information to an on-site server or master controller 128 that can store and/or archive the data to provide, for example, source data for generation of predictions in, e.g., an on-site database 130.

The user devices 124 can be any suitable communications device including, but not limited to, desktop computers, tablet computing devices, electronic book (e-book) readers, netbook computers, notebook computers, laptop computers, personal digital assistants (PDA), smart phones, web-enabled televisions, video game consoles, set top boxes (STB), digital video recorder (DVR) systems, wearable user devices, combinations thereof, or the like. The user devices 124 can be used by users, such as an operator in the operating system 110, for a variety of purposes including, but not limited to, performing processing tasks and/or accessing one or more networks, such as the Internet, local area networks (LANs), wide area networks (WANs), or the like. Controllers 124 can be any suitable computing or processing device configured to perform processing tasks, control operation of equipment, and/or access the one or more networks. In particular, the user device(s) and/or controller(s) 124 can be configured to process and/or transmit source data, as can be collected from one or more sensors 120, generate logs or other information pertaining to asset(s) 112 or processes running thereon or associated therewith, and/or interfacing with one or more other user device and/or controller 124, the on-site server 128, and/or a predictive system 160 including a predictive engine. The user device(s) and/or controller(s) 124 can further be configured to process and/or transmit historical source data or other types of that is generated from non-sensor sources, such as operator-defined context-specific input, as is discussed elsewhere herein.

Predictions, and related notifications about an impending operational outcome of interest may be determined by the predictive system 160 by employing the systems and methods described herein. In accordance with the disclosed methodology herein, a prediction of an impending and/or relatively likely operational outcome of interest can be combined with operator-generated context-specific information for use to enhance notifications to be used by operators and or other entities (e.g., automated control entities, such as the user device(s)/controller(s) 124 and/or the on-site server/ master controller 128) in adjusting asset(s) 112 and/or system or process parameters to prevent, reduce the likelihood, and/or more promptly react to the impending and/or relatively likely operational condition of interest.

The controller(s)/user device(s) 124 and/or the master controller/on-site server 128 can be configured to communicate with one or more elements associated with the predictive system 160, in accordance with various embodiments of the disclosure. The controller(s)/user device(s) 124 and/or the master controller/on-site server 128 can be configured to provide source data, such as system, equipment, environmental or process related data, from one or more on-site database(s) 130, to the prediction engine of the predictive system 160 via one or more network(s) 140. In some embodiments, the system, equipment and/or process data can be retrieved by the predictive system 160 via the network(s) 140. The predictive system 160 can further be configured to store the sensor data, operator-generated context-specific information in, e.g., a historical source database 170, where such historical source database can be used as source data for subsequent predictions from which notifications are generated.

Figure 2A:
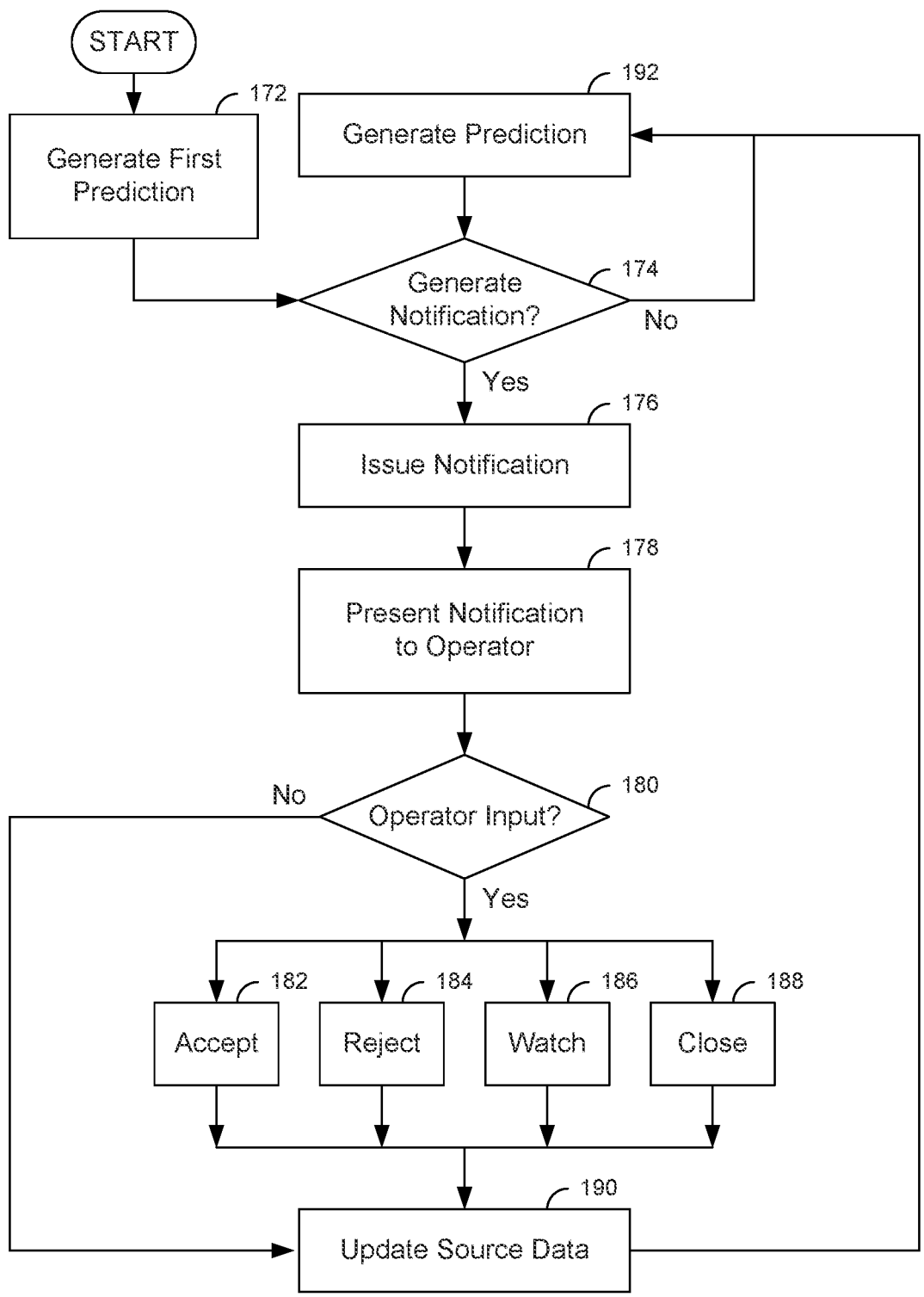

Referring next to FIGS. 2A and 2B, shown are flow diagrams illustrating examples of managing the operation of an asset or group of assets of interest utilizing the notifications and operator-generated inputs as previously discussed. Beginning at 172 in FIG. 2A, a first prediction is generated using historical source data 170 available to the predictive system 160 of FIG. 1. A prediction engine can be used to generate a prediction that an operational outcome of interest will occur within a time period of interest or epoch. An example of a prediction engine that can be used to generate the predictions is as disclosed in US Patent App. Publication No. 2016/0350671, which was previously incorporated by reference in its entirety. The first prediction can comprise a probability value associated with the likelihood that the operational outcome of interest will occur within the defined future period. The prediction can be compared to one or more prediction ranges to determine a risk category associated with the prediction.

A notification can be generated at 174 in response to the comparison of the prediction to prediction ranges. For example, risk categories of "low/no risk," "moderate risk," "high risk," or "extreme risk," can be assigned, where such risk categories are defined in relation to the likelihood (or lack thereof) that an operational outcome of interest will occur in the future period or epoch. While a notification may not be generated when the prediction falls in the "low" or "no risk" category, different types or levels of notification can be generated for the different risk categories. The type or form of the notification can be based upon the comparison with the prediction ranges. In some cases, the notification can include an indication of lead time associated with a particular action that would be taken in response to the notification. The notification can also include an outcome horizon associated with the operational outcome of interest.

If a notification is generated at 174, then it is issued at 176 by the predictive system 160 to via, e.g., a user device 124 associated with an operator of the system 110 or asset(s) 112. At 178, the notification can be presented to the operator in the form of a queue or listing through a user interface on the user device 124. In response to the notification, the operator can then choose to provide one or more user-generated input through the user interface as will be discussed in more detail below. Operator inputs can include accepting the notification at 182, rejecting the notification at 184 and/or watching the notification at 186. The operator inputs can also include closing the notification to deactivate or remove the notification from the queue or listing.

The source data can then be updated at 190 based on the operator-generated inputs, and the updated source data can be used to generate a subsequent prediction at 192. If not operator input is received at 180 within a defined period of time, then the source data can be updated based on this lack of response at 190 as well. In this way, the real time (or near real time) operator-generated inputs can permit subjective information about the operation of system 110 and/or the asset or group of assets 112 of interest to be used to tune the predictive output to enhance its value in use. After the generation of the next prediction at 192, the flow returns to 174 where another notification can be generated and issued as previously described.

FIG. 2B further illustrates examples of various operator-generated inputs that can be provided by the operator. If the operator wishes to provide input in response to a notification at 180, the operator can accept the notification at 182 as being "true" or "trusted" based upon current, that is, contextural, knowledge of the system 110 and/or asset(s) 112. As part of the acceptance, the operator can initiate an action in response to the notification. For example, a work order can be created by the operator to initiate or schedule maintenance, repair, replacement or other appropriate action based upon the notification. In some implementations, subsequent notifications can be muted to prevent presentation to the operator until the scheduled action is completed, or until a higher risk prediction is generated. In some cases, the operator can acknowledge that the notification is "true" without initiating any action at the current time. For instance, if the operator is aware of an upcoming event that will address the notification, then an acknowledgement can be indicated. In some situations, equipment may be allowed to continue operating even though failure or other hazard may be predicted.

The operator can also forward or re-route the notification to a supervisor or another operator who may have more specific knowledge about the operational conditions associated with the notification. Such an action would indicate that the operator considers the prediction to be valid in the context of real time or substantially real time operational conditions, but that may need additional information or authorization to take appropriate action on the notification. In some implementations, subsequent notifications for the corresponding prediction may be re-routed to the other operator. In each of the acceptance options, additional information or comments can be provided by the operator to further enhance the value of the operator input. The operator-generated input provided by any of these actions can be added to the source data at 190 to enhance subsequent predictions.

The operator can alternatively disagree with the prediction and reject the notification at 184 as, e.g., not being "true" or "trusted" in the context of real time or substantially real time operational conditions. This decision can be based upon the operator's current knowledge of the system 110 and/or asset(s) 112, or the lack of enough information to be able to validate the notification. For example, the operator can inspect the system 110 and/or asset(s) 112 to determine whether the notification should be accepted or rejected. Based on the inspection, a proper response can be provided. The reason for rejecting the notification can be provided with the response. For instance, a warning can be rejected based upon contrary information, an inspection, or for another reason such as, e.g., an inability to service the asset. A notification may also be rejected after a work order is created if no evidence to perform the work or maintenance is found. Even though the operator rejects the notification, it can also be forwarded or re-routed to a supervisor or another operator who may have more specific knowledge about the operational conditions associated with the notification. In some implementations, subsequent notifications for the corresponding prediction may be re-routed to the other operator.

The operator can also suppress the notification when it has been rejected. In this case, notifications that are generated at 174 (FIG. 2A) during the outcome horizon associated with that notification are not be presented to the operator at 178 (FIG. 2A) if the corresponding prediction was within the same (or a lower) prediction range as that corresponding to the suppressed notification. A subsequent notification can be prevented by not generating the notification at 174, or alternatively not issuing the notification to the user device 124 at 176 or not presenting the notification in the user interface at 178. If no notification is presented, then operator-generated input is not provided to update the source data and the flow returns to 192 to generate the next prediction. The outcome horizon can be pre-defined, either manually or automatically, or the outcome horizon can be operator-defined after delivery of one or more of the notifications. An outcome horizon can also be modified by the operator based upon context-specific information known by the operator. The notification associated with a particular outcome horizon can be configured to expire at the end of the outcome horizon. Yet further, the notification associated with a particular outcome horizon can be configured to be suppressed or muted until the expiration of the outcome horizon, or for a period of time defined by the operator. In each of the rejection options, additional information or comments can be provided by the operator to further enhance the value of the operator input. The operator-generated input provided by any of these actions can be added to the source data at 190 to enhance subsequent predictions.

Referring to FIG. 2C, shown is an example that can be used to illustrate the issuance of notifications based on daily prediction outputs and the effect of the outcome horizon. In the example of FIG. 2C, the predictions are classified (based upon prediction ranges) as "low" risk (L), "medium" risk (M), "high" risk (H) and "extreme" risk (EX). As can be seen, the level of the classification can vary from day-to-day based upon the source data, prediction engine, and other factors such as, e.g., operator-generated inputs. In this example, no notification is generated for a "low" risk prediction, so no notifications are provided for days 1, 2 and 3. On day 4, a "medium" risk prediction is generated and a corresponding notification is presented. A "high" risk prediction is then generated on day 5, which results in a "high" risk notification being presented. As can be seen in FIG. 2C, lower risk predictions are generated for days 6, 7 and 8. However, an outcome horizon of three days or more after the initial prediction, the notification level does not change.

If the notification on day 5 was suppressed, then the subsequent notifications would not be presented to the operator until a higher risk level is predicted or the outcome horizon expires. If a higher risk level is predicted, then a corresponding notification is presented to the operator. This is illustrated in FIG. 2C, where on day 9 an "extreme" risk was predicted and a corresponding notice was presented to the operator. If the outcome horizon expires, then the notification level is allowed to reset to no notification, or to a notification that has a pending outcome horizon and corresponds to the next lower risk level. For example, if the outcome horizon for the "high" risk prediction on day 5 and the "medium" risk prediction on day 7 was three days after the initial prediction, and the prediction on day 9 was "low" risk instead of "extreme" risk, then the notification on day 9 would revert to a "medium" risk notification based on the predication of day 7.

Referring back to FIG. 2B, the operator can also choose to watch the notification at 186 without designating it as accepted or rejected. The operator can "snooze" the notification, which results in a temporary suppression of the notification for an operator specified duration. In that case, the notification can remain in the queue or listing, with no additional notifications being presented unless the classification of the corresponding predictions increases. In some cases, the notification can be hidden by the operator for the duration of the outcome horizon, or until a higher risk prediction is generated. The operator can also forward or re-route the notification to a supervisor or another operator who may have more specific knowledge about the operational conditions associated with the notification. In all of these options, additional information or comments can be provided by the operator to further enhance the value of the operator input. The operator-generated input provided by any of these actions can be added to the source data at 190 to enhance subsequent predictions.

The operator can also close the notification at 188. The operator can choose to hide the notification, which would hide the notification from view in the queue or listing for the duration of the outcome horizon, or until a higher risk prediction is generated. Deactivation of the notification can remove the notification from the queue or listing, and thus cancel any remaining actions or outcome horizon term. Additional information or comments can be provided by the operator to further enhance the value of the operator input in either case. The operator-generated input provided by any of these actions can be added to the source data at 190 to enhance subsequent predictions.

Figure 3:
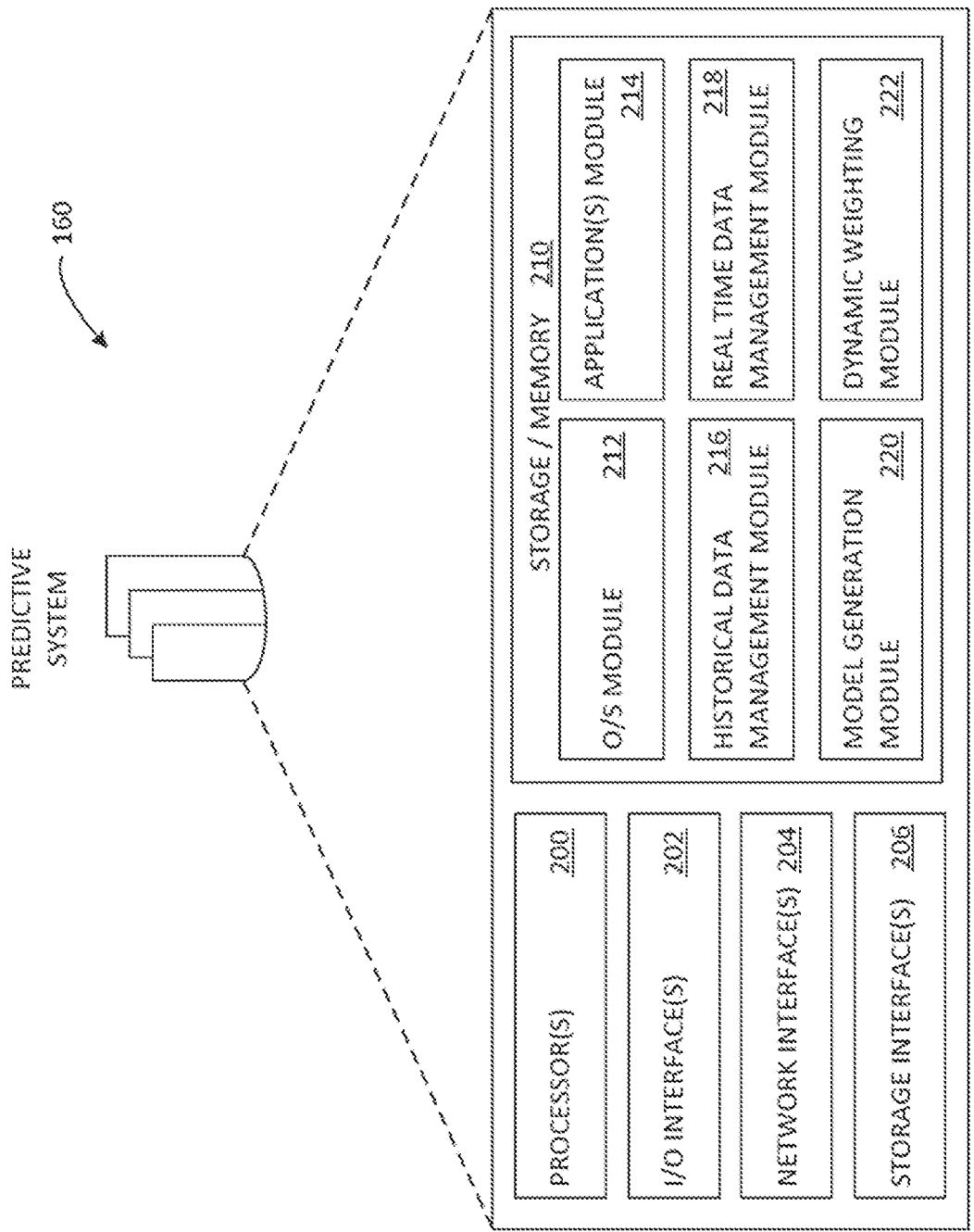
FIG. 3 is a simplified schematic diagram of an example of a predictive system, in accordance with various embodiments of the present disclosure.

FIG. 3 is a simplified block diagram illustrating an example of a predictive system 160 for generating and deploying dynamically updated predictive models, in accordance with various embodiments of the disclosure. The predictive system 160 may include one or more processors (s) 200, one or more input/output (I/O) interfaces 202, one or more network interface(s) 204, one or more storage interface(s) 206, and one or more storage or memories 210.

The processor(s) 200 of the predictive system 160 can be implemented as appropriate in hardware, software, firmware, or combinations thereof. Software or firmware implementations of the processor(s) 200 can include computer-executable or machine-executable instructions written in any suitable programming language to perform the various functions described. Hardware implementations of the processor(s) 200 may be configured to execute computer-executable or machine-executable instructions to perform the various functions described. The one or more processor (s) 200 can include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The predictive system 160 can also include a chipset (not shown) for controlling communications between one or more processor(s) 200 and one or more of the other components of the predictive system 160. The processor(s) 200 may also include one or more application specific integrated circuits (ASICs) or application specific standard products (ASSPs) for handling specific data processing functions or tasks. In certain embodiments, the predictive system 160 may be based on an Intel® Architecture system and the one or more processor(s) 200 and chipset may be from a family of Intel® processors and chipsets, such as the Intel® Atom® processor family.

The one or more I/O interface(s) 202 can enable the use of one or more I/O user interface(s). The I/O interface(s) 202 can be configured to receive and/or provide signals to/from the processor(s) 200 from I/O user interface(s). These signals may be related to user input and output to users, such as an operator of the predictive system 160, that interact with the predictive system 160. The I/O interface(s) 202 may receive and/or provide signals to any variety of I/O user interface(s) including, but not limited to, accelerometers, gyroscopes, display screens, push-buttons, rocker switches, keyboards, biometrics reading devices, mouse pads, mice, speakers, microphones, cameras, haptic devices, combinations thereof, or the like.

The network interfaces(s) 204 may allow the predictive system 160 to communicate via network(s) 140 and/or via other communicative channels. The network interfaces(s) 204 can include one or more transceiver(s) or other communication circuitry (e.g., cellular, W-Fi, Bluetooth®, etc.) configured to facilitate communication of information (e.g., source data, operational data, predictions, notification, operator-generated inputs, etc.) between the predictive system 160, the operating system 110 (FIG. 1), controller(s)/user device(s) 124, master controller/on-site server 128, and other entities such as, e.g., centralized or local operational centers associated with the operating system 110. The one or more storage interface(s) 206 can enable the use of the storage/memory 210 and/or other memory/storage components, such as external databases (e.g., the on-site database 130 and/or the historical source database 170 of FIG. 1). The storage interface(s) 206 can be configured to receive data from the processor(s) 200 to store onto the memory 210 or other storage device or provide data from the memory 210 or other storage device to the processor(s) 200.

The memory 210 can include one or more volatile and/or non-volatile memory/storage devices including, but not limited to, magnetic storage devices, read only memory (ROM), random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

The memory 210 can store program instructions that are loadable and executable on the processor(s) 200, as well as data generated or received during the execution of these programs. Turning to the contents of the memory 210 in more detail, the memory 210 can include one or more operating systems (O/S) 212, an applications module 214, a historical source data management module 216, real time data management module 218, model generation module 220 and/or a dynamic weighting module 222. Each of the modules and/or software may provide functionality for the predictive system 160, when executed by the processors 200. The modules and/or the software may or may not correspond to physical locations and/or addresses in memory 210. In other words, the contents of each of the modules 212, 214, 216, 218, 220, 222 may not be segregated from each other and may, in fact be stored in at least partially interleaved positions on the memory 210.

The O/S module 212 can have one or more operating systems stored thereon. The processor(s) 200 can be configured to access and execute one or more operating systems stored in the (O/S) module 212 to operate the system functions of the predictive system 160. System functions, as managed by the operating system can include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

The application(s) module 214 can contain instructions and/or applications thereon that may be executed by the processor(s) 200 to provide one or more functionality associated with the predictive system 160. These instructions and/or applications can, in certain aspects, interact with the (O/S) module 212 and/or other modules of the predictive system 160. The applications module 214 may have instructions, software, and/or code stored thereon that may be launched and/or executed by the processor(s) 200 to execute one or more applications and functionality associated therewith. These applications may include, but are not limited to, functionality such as web browsing, business, communications, graphics, word processing, publishing, spreadsheets, databases, gaming, education, entertainment, media, project planning, engineering, drawing, or combinations thereof. In some embodiments, the processor(s) 200, by executing instructions stored in the application(s) module 214, may be configured to establish predictive operational outcomes of interest and/or analytical models and deploy the same for real time or near real time operational outcomes of interest monitoring based on received data and/or information.

The source data management module 216 can have instructions stored therein that, when executed by the processor(s) 200, enables the predictive system 160 to perform a variety of processes associated with retrieving/receiving source data (which may include historical data 170), managing the source data (which includes incorporation of the received operational data derived from continued operation of the operating system 110 or asset(s) 112, and real time (or near real time) operator-generated inputs, to generate updated source data for further use and analysis herein), and/or storing such information as historical source data 170. In various embodiments, the processor(s) 200 can be configured to transmit a request for source data and/or historical source data 170 and receive, responsive to the request, the source data or other historical source data over a span of time. The processor(s) 200 can be configured to receive sensor data and/or log data from controller(s) or user device(s) 124 (FIG. 1), either directly from one or more sensors 120 or the user device(s) 124, or from other intermediary entities, such as the master controller or on-site server 128 (FIG. 1), and store the senor data and/or log data in the historical source data 170. The processor(s) 200 can also be configured to receive operator-generated input(s) from the user device(s) 124 via a user interface. The historical source data 170 may be used to archive pertinent data related to operation of the operating system 110 or asset(s) 112 for any suitable time period for later use.

The real time data management module 218 can have instructions stored therein that, when executed by the processor(s) 200, can enable the predictive system 160 to perform a variety of processes (e.g., various aspects of the predictive analytics processes of FIGS. 2A and 2B) or portions of the processes associated with receiving real time or near real time data and generating predictions from the incoming data to identify any impending operational outcomes of interests in the operating system 110, asset(s) 112, or processes being monitored. The predictive system 160 may receive real-time or near real-time data from the sensors deployed at the operating system 110, such as via the controller(s)/user device(s) 124, the master controller/on-site server 128, and/or network(s) 140. The predictive system can also receive real time or near real time operator-generated inputs to update the source data. The received operational data and operator-generated inputs can then be used to predict operational outcomes of interests in the operating system 110, asset(s) 112, and/or processes to which the real time and/or near real time data pertain. When the predictive system 160 makes a prediction of one or more operational outcomes of interest (e.g., a fault that is predicted to likely occur within some pre-determined span of time in the future), the predictive server 160 may be configured to provide an indication or notification thereof to one or more entities associated with the operating system 110 or asset(s) 112 such as, e.g., to an operator via his/her user device 124.

Embodiments described herein may be implemented using hardware, software, and/or firmware, for example, to perform the methods and/or operations described herein. Certain embodiments described herein may be provided as one or more tangible machine-readable media storing machine-executable instructions that, if executed by a machine, cause the machine to perform the methods and/or operations described herein. The tangible machine-readable media may include, but is not limited to, any type of disk including floppy disks, optical disks, compact disk read-only memories (CD-ROMs), compact disk rewritable (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing or computing platform, device or system and may be implemented using any suitable combination of hardware and/or software. The instructions may include any suitable type of code and may be implemented using any suitable programming language. In other embodiments, machine-executable instructions for performing the methods and/or operations described herein may be embodied in firmware. Additionally, in certain embodiments, a special-purpose computer or a particular machine may be formed in order to identify actuated input elements and process the identifications.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A computer implemented method of managing operation of at least one asset of interest, comprising the steps:
   a. presenting a first generated prediction associated with an operational outcome of interest and sensor data received in real-time, where the first generated prediction includes at least one probability value associated with a likelihood that the operational outcome of interest will occur within a defined future period, where the operational outcome of interest is associated with at least one asset;
b. comparing the first generated prediction with a plurality of prediction thresholds, where each of the plurality of prediction thresholds, independently, comprises an upper and a lower value defining a prediction range associated with a risk profile assigned to the operational outcome of interest, where at least one of the plurality of prediction thresholds comprises a prediction threshold of interest; and
c. presenting a notification to an operator when the comparison indicates that the prediction threshold of interest has been reached or exceeded by the first generated prediction, wherein:
 i. the notification provides the operator with information associated with a level of risk that the operational outcome of interest will occur within the defined future period; and
 ii. a real-time operator-generated input associated with the notification is receivable from the operator, where the real-time operator-generated input comprises one of at least two real-time operator-defined selections, where the at least two real-time operator-defined selections comprise:
  1. a first operator-defined selection comprising operator input associated with an operator decision that the notification is accurate when applied to the current operation of the at least one asset and action on the notification should be scheduled;
  2. a second operator selection comprising operator input associated with rejection of the notification, where the second selection results from determination by the operator that, in relation to the current operation of the at least one asset, the notification is incorrect or that the notification is correct, but that the operator will not currently schedule action to address the notification; and
  3. a third operator selection comprising operator input associated with placing the notification in a watch queue for a period of time, wherein no additional notifications are provided until there is a change in the prediction threshold of interest; and
 iii. information associated with the operator-generated input is configured for use as source data in subsequent predictions generated by the prediction engine; and
d. incorporating at least a portion of the operator-generated input as updated source data in the generation of subsequent predictions from the prediction engine.

2. The computer-implemented method as recited in claim 1, further including the steps:
providing a historical data management module;
providing a real time data management module;
providing at least one memory that stores computer-executable instructions; and
receiving in real-time sensor data from a plurality of sensor devices; and
providing at least one processor coupled to the historical data management module and real time data management module.

3. The computer-implemented method as recited in claim 2, wherein the first generated prediction is further obtained from an analysis of historical source data by a prediction engine.

4. The computer-implemented method as recited in claim 2, further including generating an outcome horizon for the notification, wherein the outcome horizon comprises a period of time that the notification is available for presentation to the operator.

5. The computer-implemented method of claim 4, wherein the first generated prediction is associated with a prediction threshold indicating that the operational outcome of interest is likely to occur, and if the operational outcome of interest occurs prior to the end of the outcome horizon, the notification is identified as "positive prediction information".

6. The computer-implemented method of claim 4, wherein the first generated prediction is associated with a prediction threshold indicating that the operational outcome of interest is likely to occur, and if the operational outcome of interest does not occur prior the end of the outcome horizon, the notification is optionally identified as "negative prediction information".

7. The computer-implemented method of claim 1, wherein the operator input of the second operator selection initiates either:
a. suppression of subsequent notifications for a period of time; or
b. re-routing the notification to a second operator for action thereupon.

8. The computer-implemented method of claim 1, wherein the operator input of the second operator selection comprises a second prediction threshold of interest specified by the operator, and wherein the second operator selection initiates suppression of subsequent notifications until the second prediction threshold of interest is reached or exceeded, wherein when the second prediction threshold of interest is reached or exceeded, the suppressed notification:
a. is made visible to the operator for action thereupon;
b. is suppressed again for a period of time; or
c. re-routed to a second operator for action thereupon.

9. The computer-implemented method of claim 1, wherein the plurality of prediction thresholds are modifiable in response to an operator input.

10. The computer-implemented method of claim 1, wherein the operational outcome of interest includes one or more of a fault, a failure, energy use, resource use, production quantity, production quality, compliance with required operational parameters, or an operational cost metric.

11. The computer-implemented method of claim 1, wherein the at least one asset of interest are associated with a vehicle, industrial machine or industrial process.

12. The computer-implemented method of claim 1, wherein the historical source data comprises information derived from:
a. one or more sensors associated with an operating system, hardware device, or machine; and
b. recorded information associated with operation of the operating system, hardware device, or machine.

13. The computer-implemented method of claim 12, wherein the one or more sensors comprise thermometers, hygrometers, pressure sensors, flow meters, vibration sensors, odometers, accelerometers, ammeters, voltmeters, power meters, digital multi-meters, digital imagers, microscopes, distance measurement devices, tackiness detectors, rigidity detectors, stiffness detectors, alignment detectors, pH detectors, GPS detectors, or combinations thereof.

14. The computer-implemented method of claim 1, wherein the notification comprises a lead time associated with an action addressing the operational outcome of interest of the notification.

15. A computer system for managing operation of an asset or group of assets of interest, comprising:
   a memory configured to store instructions;
   a processor disposed in communication with said memory, wherein said processor upon execution of the instructions is configured to:
   a. present a first generated prediction associated with an operational outcome of interest and sensor data received in real-time, where the first generated prediction includes at least one probability value associated with a likelihood that the operational outcome of interest will occur within a defined future period, where the operational outcome of interest is associated with at least one asset;
   b. compare the first generated prediction with a plurality of prediction thresholds, where each of the plurality of prediction thresholds, independently, comprises an upper and a lower value defining a prediction range associated with a risk profile assigned to the operational outcome of interest, where at least one of the plurality of prediction thresholds comprises a prediction threshold of interest; and
   c. present a notification to an operator when the comparison indicates that the prediction threshold of interest has been reached or exceeded by the first generated prediction, wherein:
   iii. the notification provides the operator with information associated with a level of risk that the operational outcome of interest will occur within the defined future period; and
   iv. a real-time operator-generated input associated with the notification is receivable from the operator, where the real-time operator-generated input comprises one of at least two real-time operator-defined selections, where the at least two real-time operator-defined selections comprise:
   1. a first operator-defined selection comprising operator input associated with an operator decision that the notification is accurate when applied to the current operation of the at least one asset and action on the notification should be scheduled;
   2. a second operator selection comprising operator input associated with rejection of the notification, where the second selection results from determination by the operator that, in relation to the current operation of the at least one asset, the notification is incorrect or that the notification is correct, but that the operator will not currently schedule action to address the notification; and
   3. a third operator selection comprising operator input associated with placing the notification in a watch queue for a period of time, wherein no additional notifications are provided until there is a change in the prediction threshold of interest; and
   iii. information associated with the operator-generated input is configured for use as source data in subsequent predictions generated by the prediction engine; and
   d. incorporating at least a portion of the operator-generated input as updated source data in the generation of subsequent predictions from the prediction engine.

16. The computer system as recited in claim 15, further including:
   a historical data management module; and
   a real time data management module wherein the processor is coupled to the historical data management module and real time data management module.

17. The computer system as recited in claim 16, wherein the first generated prediction is further obtained from an analysis of historical source data by a prediction engine.

18. The computer system as recited in claim 17, wherein the processor is further configured to generate an outcome horizon for the notification, wherein the outcome horizon comprises a period of time that the notification is available for presentation to the operator.

19. The computer system as recited in claim 17, wherein the first generated prediction is associated with a prediction threshold indicating that the operational outcome of interest is likely to occur, and if the operational outcome of interest occurs prior to the end of the outcome horizon, the notification is identified as "positive prediction information".

20. The computer system as recited in claim 17, wherein the first generated prediction is associated with a prediction threshold indicating that the operational outcome of interest is likely to occur, and if the operational outcome of interest does not occur prior the end of the outcome horizon, the notification is optionally identified as "negative prediction information".

* * * * *